July 12, 1927.

C. S. LUTES 1,635,219

OIL VALVE ATTACHMENT FOR ENGINE CRANK CASINGS

Original Filed March 15, 1924

INVENTOR
CHARLES S. LUTES
BY William S. Fowler,
ATTORNEY

Patented July 12, 1927.

1,635,219

UNITED STATES PATENT OFFICE.

CHARLES S. LUTES, OF SASKATOON, SASKATCHEWAN, CANADA.

OIL-VALVE ATTACHMENT FOR ENGINE CRANK CASINGS.

Application filed March 15, 1924, Serial No. 699,606. Renewed December 6, 1926.

This invention has relation to certain new and useful improvements in an oil valve attachment for an engine crank casing and has for its primary object the provision of an attachment of this character, which is especially adapted to the crank casing of an engine of a motor vehicle, such as the Ford.

Another object of the invention resides in the provision of an oil valve attachment of the character stated which is of simple construction and operation and may be readily applied to an engine crank casing, without the necessity of altering the construction thereof.

With the foregoing and other objects in view, as will appear as the description proceeds, this invention consists in the novel construction, combination and arrangement of co-operating elements as hereinafter more specifically set forth, claimed and shown in the accompanying drawings forming a part of the present application, in which:

Figure 1:
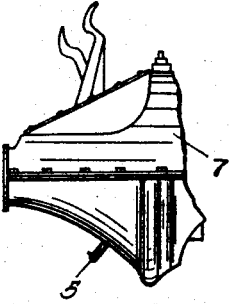
Fig. 1 is a fragmentary elevation of a motor vehicle engine crank casing with the present invention applied thereto.

Referring more in detail to the drawings in which similar reference characters designate corresponding parts throughout the several views, it is to be noted that the attachment includes a turned, substantially L-shape member 5 having a reduced threaded end 6 which may be readily secured in an opening provided for this purpose in the lower portion of the crank casing 7. The member 5 has its other end 8 interiorly threaded to receive the valve tube 9, the end of which engages the internal annular flange 10 in the last mentioned end of the member 5, as shown clearly in Fig. 2. The internal annular flange 11 at the free upper end of the valve tube 9 is provided with a valve seat 12 for engagement by the spherical valve member 13. An expansion spring 14 is located in the valve tube 9 with one end bearing against the valve member 13, while its other end rests upon the flange 10, in the member 5 to resiliently retain the valve member 13 in its normal position in engagement with its valve seat 12 to close the valve tube 9.

Figure 2:
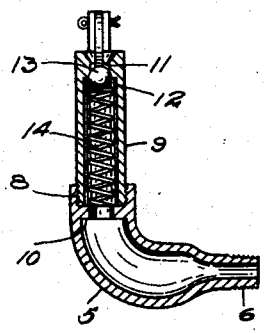
Fig. 2 is an enlarged detail section through the attachment.
Figure 3:
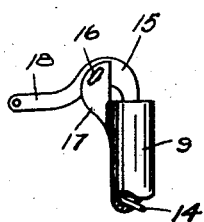
Fig. 3 is a fragmentary elevation of the attachment.

An arcuate pivoted valve opening member 16 is extended through the bifurcated bracket member 17 mounted on the valve tube 9 and projecting past the extended end thereof as shown clearly in Figures 2 and 3. The handle 18 of the valve opening member 15 extends at an angle thereto and may have attached to its free end a rod or other suitable operating member, by means of which it may be operated from the side of the motor vehicle or from any other desired point.

It is to be noted that the complete construction and operation of the attachment may be readily understood from the foregoing paragraphs taken in connection with the accompanying drawings without further detail description. It may be briefly stated, however, that the valve member 13 normally remains in closed and seated position and thereby prevents escape of oil from the crank casing 7. When it is desired to determine whether the crank casing 7 contains sufficient oil, the valve opening member 15 is operated on the pivoted member 16 to cause the curved free end thereof to press the valve member 13 away from the valve seat 12, against the action of the expansion spring 14. If there is sufficient oil in the crank casing 7, this fact will be shown by oil passing the unseated valve member 13 and escaping from the valve 9. The valve opening member 15 may then be released to permit the expansion spring 14 to return the valve opening member 15 to normal, unoperated position. If there is not sufficient oil in the crank casing 7, this fact will be readily recognized by the oil level in the crank casing 7 being too low to permit an escape of oil when the valve opening member 15 is operated to open the valve by unseating the valve member 13. Therefore, this attachment will make it possible to maintain the proper quantity of oil in the crank casing 7 at all times, without danger of the oil leaking out of the crank casing 7, as heretofore, owing to the employment of leaky pet cocks or other valves in the lower portions of crank casings.

While the preferred embodiment of the present invention has been disclosed, it is to be noted that minor changes in the details of construction, combination and arrangement of co-operating elements may be resorted to within the scope of what is claimed without departing from the spirit of the invention.

What I claim as new is:

An oil valve attachment for a crank casing including a turned member having a through passage and a reduced end adapted to be secured in the wall of a crank casing; a valve tube carried by the other end of said member; an annular flange carried by the said member; said tube being engaged on said flange; a valve seat carried by said tube; a valve member normally engaged with said valve seat to close said tube; means engaged with said valve member and with said flange of the first mentioned member to resiliently retain said valve member in engagement with said valve seat; a valve opening member for forcing said valve member away from said valve seat to open said valve tube; and means for pivotally mounting said valve opening member on said valve tube.

In testimony whereof, I affix my signature.

CHARLES S. LUTES.